United States Patent [19]

Wedam et al.

[11] Patent Number: 5,418,619
[45] Date of Patent: May 23, 1995

[54] APPARATUS AND METHOD FOR SELECTIVELY ADAPTING A PLAYBACK CHARACTERISTIC TO MEET VIDEO PERFORMANCE REQUIREMENTS

[75] Inventors: Werner F. Wedam, Lawrenceville; Ted N. Altman, East Windsor, both of N.J.

[73] Assignee: SamSung Electronics Co., Ltd., Kyungki-do, Rep. of Korea

[21] Appl. No.: 728,739

[22] Filed: Jul. 12, 1991

[51] Int. Cl.⁶ .............................................. H04N 9/79
[52] U.S. Cl. .................................... 358/310; 358/315; 358/320
[58] Field of Search ............... 358/310, 335, 320, 323, 358/337, 330, 105, 316, 315; H04N 9/79

[56] References Cited

U.S. PATENT DOCUMENTS

| | | | |
|---|---|---|---|
| 4,831,463 | 5/1989 | Faroudja | 358/330 |
| 4,956,726 | 9/1990 | Takimoto et al. | 358/335 |
| 5,105,315 | 4/1992 | Bannai et al. | 358/315 |
| 5,113,262 | 5/1992 | Strolle et al. | 358/310 |

Primary Examiner—Tommy P. Chin
Assistant Examiner—Huy Nguyen
Attorney, Agent, or Firm—Robert E. Bushnell

[57] ABSTRACT

In a backward compatible video signal recording and playback system for recording a full bandwidth video signal on a limited bandwidth medium utilizing a luminance signal having high frequencies being folded into low frequencies and unfolded on playback, apparatus includes circuitry for selecting a desired level of high frequency performance for a given degree of reverse compatibility and circuitry for recording a signal indicative of the level.

32 Claims, 2 Drawing Sheets

Fig. 1

Fig. 2

APPARATUS AND METHOD FOR SELECTIVELY ADAPTING A PLAYBACK CHARACTERISTIC TO MEET VIDEO PERFORMANCE REQUIREMENTS

BACKGROUND OF THE INVENTION

The present invention relates generally to apparatus and a method for processing video signals comprising chrominance and luminance signals and, more particularly, to video signals as generally processed in a video tape recorder wherein a separate channel is used for recording a chrominance signal on a magnetic tape.

As is known, the spectrum of a luminance (and sync) television signal includes a dc component and components at harmonics of the horizontal scan frequency, each with a cluster about it of components separated at the vertical scan rate. Chrominance information is generally transmitted in the spectral gaps between these components. In the NTSC system, for example, two components of the chrominance signal, the in-phase (I) and quadrature (Q) signals, are amplitude modulated in quadrature to each other onto a subcarrier whose frequency (3.579545 MHz) has been selected to cause the resulting chrominance sidebands to fall in the spectral gaps between the luminance spectral components. The composite signal thus includes interleaved luminance and chrominance signals. The subcarrier frequency results in horizontal, vertical, and temporal interleaving so as to minimize mutual interference from cross-talk between the luminance and chrominance signals.

In typical video recording systems such as video cassette recorders (VCR's) used in the home for recording television signals, it is known, for the purpose of recording on a magnetic tape, to transpose the chrominance signal conventionally situated in the upper portion of the frequency spectral band of a composite television signal to a position in the spectral band below the luminance signal. Such a modulation or down conversion is commonly known in the recording art as a "color-under" recording system. In such a color-under system, the in-phase (I) and quadrature (Q) components of the chrominance signal are processed conventionally, albeit, at a different carrier frequency to develop a color signal (C) for displaying a scene.

The well-known VHS system utilized in many VCR's produces degraded picture quality in comparison with, for example, properly received and processed broadcast television signals because it does not provide the full necessary horizontal resolution. It has long been a goal of television engineers to find ways of transmitting more information in a channel of given bandwidth. The frame and line rates are generally fixed in accordance with standards, and therefore, a bandwidth limitation typically results in a reduction in horizontal resolution. The typical restricted bandwidth of, for example, the VHS system of about 2.0 to 2.5 MHz thus produces an image of inadequate horizontal resolution.

Various techniques are known for recording a full bandwidth signal on a limited bandwidth medium such as magnetic tape. U.S. Pat. No. 5,113,262 issued 12 May 1992 to C. H. Strolle et alii, entitled VIDEO DIGNAL RECORDING SYSTEM ENABLING LIMITED BANDWIDTH RECORDING AND PLAYBACK, and herein incorporated by reference, discloses such as system. Furthermore, a number of prior U.S. patent applications and other publications are discussed in U.S. Pat. No. 5,113,262 of Strolle et al. Related subject matter is also disclosed in the following patent applications, herein incorporated by reference: U.S. patent application Ser. No. 07/562,907, filed Aug. 6, 1990, of Ko et al., entitled REMOVAL OF THE FOLDING CARRIER AND SIDEBANDS FROM AN UNFOLDED VIDEO SIGNAL; and U.S. patent application Ser. No. 07/531,070, filed May 31, 1990 of Strolle et al., entitled COLOR-UNDER CHROMA CHANNEL ENCODED WITH AUXILARY SIGNALS. U.S. Pat. No. 5,083,203 issued Jan. 21, 1992, to J. W. Ko and Hermann J. Weckenbrock, entitled CONTROL SIGNAL SPREADER, and incorporated herein by reference also discloses subject matter relevant to the U.S. Pat. No. 5,113,262. Other systems, such as, for example, that disclosed in U.S. Pat. No. 4,831,463, issued May 16, 1989 to Faroudja, herein incorporated by reference, require modification of the format such that a tape recorded in accordance with that system would result in undesirable artifacts or defects in the picture when played back on a standard unmodified VHS machine.

In a system such as that described in the afore-mentioned pending U.S. patent application Ser. No. 07/569,029, filed Aug. 17, 1990 of Strolle et al., entitled AN IMPROVED VIDEO SIGNAL RECORDING SYSTEM, (Samsung Docket No. 1020) backward compatibility is available for video signals recorded in the improved (I-VHS) format and such recorded signals can be played back on a standard VHS player. In setting up system parameters, a compromise can be struck between the backward compatibility which is often a desirable advantage and the picture quality which may be somewhat compromised by artifacts under certain conditions. Thus, the quality of the I-VHS picture is generally less than optimum possible without constraints because of the need to provide backward compatibility. Nevertheless, conditions may arise when one or the other of these two conflicting requirements is the more important. For example, a user of a camcorder may wish to decide that backward compatibility for playback on a standard VHS machine, while nevertheless desirable and required, is not a factor of such major importance in a particular application that it should be allowed to compromise unduly a picture intended to be reproduced from the same recording medium on an I-VHS machine. Conversely, a user may wish to decide that a high degree of backward compatibility is so desirable in another particular application that the quality of reproduction when using an I-VHS machine need not be the utmost. However, in both instances, the user is constrained to accept the built-in engineering compromise the manufacturer has opted to design into the equipment as offering a generally acceptable solution under various conditions of use.

SUMMARY OF THE INVENTION

The word "level" as used in this summary, in other parts of this specification and in the claims is defined as the ratio of a quantity's magnitude to an arbitrarily selected magnitude.

In accordance with an aspect of the invention, apparatus in a backward compatible video signal recording and playback system for recording a full bandwidth video signal on a limited bandwidth medium utilizing a luminance signal having high frequencies being folded into low frequencies and unfolded on playback includes circuitry for selecting a desired level of high frequency performance for a given degree of reverse compatibility and circuitry for recording a signal indicative of the level. In accordance with another aspect of the invention, in a backward compatible video signal recording and playback system for recording a full bandwidth video signal on a limited bandwidth medium utilizing a luminance signal having high frequencies being folded into low frequencies and unfolded on playback, a method for selecting a desired level of high frequency performance for a given degree of reverse compatibility, comprises the steps of:

a. selecting a level for the high frequencies being folded;
b. be recording a signal indicative of the level;
c. sensing the signal on playback; and
d. utilizing the signal as a control signal for compensating on playback for the level selected for the high frequencies.

In accordance with another aspect of the invention, step a. is performed by selectively attenuating below a normal level the high frequencies being folded.

In accordance with yet another aspect of the invention, step a. is under user control.

In accordance with yet another aspect of the invention, step b. is performed by encoding the signal into a data stream being recorded on tape.

In accordance with yet another aspect of the invention, step d. is performed by controlling a variable attenuator.

In accordance with yet another aspect of the invention, step d. is selectively disabled and a predetermined attenuation substituted therefor.

In accordance with a further aspect of the invention, in a backward compatible video signal recording and playback system for recording a full bandwidth video signal on a limited bandwidth medium utilizing a luminance signal having high frequencies being folded into low frequencies and unfolded on playback, apparatus for selecting a desired level of high frequency performance for a given degree of reverse compatibility, comprises:

a. circuitry for selecting a level for the high frequencies being folded;
b. be circuitry for recording a signal indicative of the level;
c. circuitry for sensing the signal on playback; and
d. circuitry for utilizing the signal as a control signal for circuitry for compensating on playback for the level selected for the high frequencies.

In accordance with yet a further aspect of the invention, the circuitry for selecting a level for the high frequencies being folded selectively attenuates below a normal level the high frequencies being folded.

In accordance with yet a further aspect of the invention, the circuitry for selecting a level for the high frequencies being folded is under user control.

In accordance with yet a further aspect of the invention, the circuitry for recording a signal indicative of the level encodes the signal into a data stream being recorded on tape.

In accordance with yet a further aspect of the invention, the apparatus includes variable attenuator circuitry, wherein the circuitry for utilizing the signal as a control signal for compensating on playback for the level selected for the high frequencies controls the variable attenuator circuitry.

In accordance with yet a further aspect of the invention, the circuitry for utilizing the signal as a control signal for compensating on playback for the level selected for the high frequencies can be selectively disabled and a predetermined attenuation substituted therefor.

In accordance with a still another aspect of the invention, a backward compatible video signal recording system for recording a full bandwidth video signal on a limited bandwidth medium, the system comprises:

encoding circuitry for receiving a composite video signal for producing a luminance signal having attenuated high frequencies folded into low frequencies and a signal including a chrominance component and a motion component;
circuitry coupled to the encoding circuitry for recording the luminance signal;
circuitry coupled to the encoding circuitry for recording the chrominance and motion signal;
user operable circuitry coupled to the encoding circuitry for selecting a level for the high frequencies being folded;
circuitry coupled to the user operable circuitry for applying for recording a signal indicative of the level to one of the circuitry for recording the luminance signal and the circuitry for recording the chrominance and motion signal.

In accordance with a still another aspect of the invention, the circuitry for applying for recording applies the signal indicative of the level to the circuitry for recording the chrominance and motion signal.

In accordance with a still another aspect of the invention, a video signal recording system in accordance with claim 18, comprises:

playback circuitry for sensing the signal indicative of the level; and
circuitry coupled to the playback circuitry for utilizing the signal as a control signal for compensating on playback for the level selected for the high frequencies.

In accordance with a further aspect of the invention, a video signal recording system for recording a full bandwidth video signal on a limited bandwidth medium along with a control signal indicative of a relative amplitude setting of a folded spectral portion of luminance high frequencies, the system comprises:

encoding circuitry for adaptively processing a composite video signal in response to a motion representative signal and producing first and second signals, the first signal being a luminance signal having a spectral portion of luminance high frequencies having a relative amplitude setting and being subsampled so as to be in folded into a spectral gap in the low frequencies, and being bandwidth limited to the bandwidth of the limited bandwidth medium, the second signal being a combined signal including a chrominance component, a motion component, and a control signal component representative of the relative amplitude setting; and
recording circuitry for recording the signals on the medium.

In accordance with a further aspect of the invention, a video playback system for reproducing a full bandwidth video signal prerecorded on a limited bandwidth medium along with a control signal representative of a relative amplitude setting of a folded spectral portion of luminance high frequencies, the system comprising:

a luminance signal playback circuit for retrieving a prerecorded luminance signal from the medium;
a chrominance signal playback circuit for retrieving a prerecorded combined chrominance and motion signal from the medium;

separator circuit circuitry coupled to the chrominance signal playback circuit for extracting the motion signal and the chrominance signal from the combined chrominance and motion signal;

decoder circuitry coupled to the separator circuit circuitry for retrieving the control signal;

unfolding circuit circuitry for extracting the folded spectral portion of luminance high frequencies and adaptively regenerating the full bandwidth luminance signal in response to the motion signal;

programmable attenuator circuitry coupled to the unfolding circuit circuitry and being responsive to the control signal for compensating for the relative amplitude setting of the folded spectral portion of luminance high frequencies; and circuitry for combining the full bandwidth luminance signal with the extracted chrominance signal for reproducing the full bandwidth video signal prerecorded on the limited bandwidth medium.

DETAILED DESCRIPTION

Figure 1:
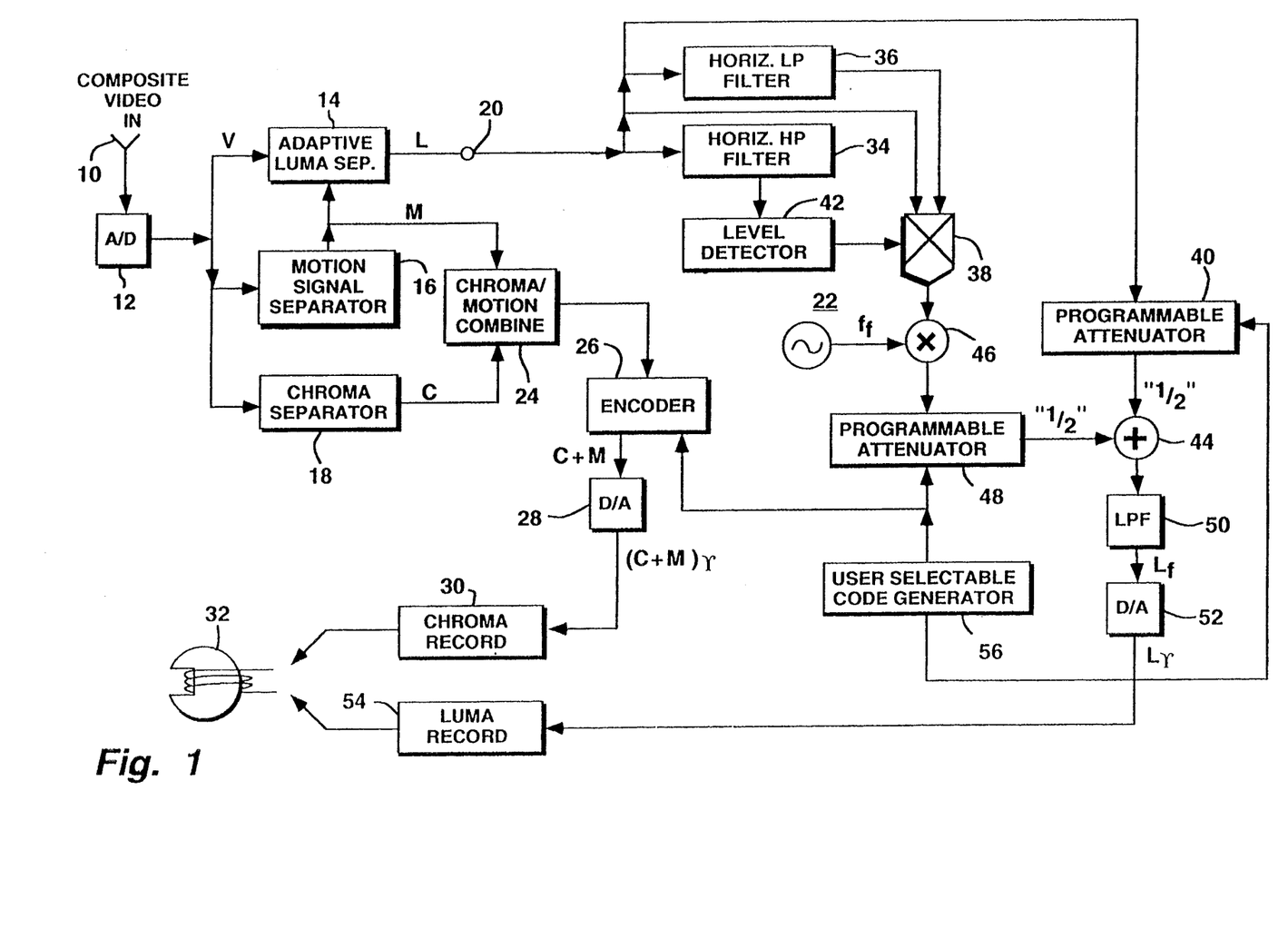
FIG. 1 shows a block schematic diagram of recording apparatus in accordance with an embodiment of the invention.

FIG. 1 shows a schematic block diagram of a portion of a record section of a video signal recorder in accordance with the principles of the present invention. In reference to FIG. 1, an input terminal 10 is coupled to a source, not shown, of a composite video signal. Input terminal 10 is coupled to an input terminal of an analog to digital converter (A/D) 12. An output terminal of A/D converter 12 is coupled to an input terminal of an adaptive luminance signal separator 14, the input terminal of a motional signal separator 16, and the input terminal of a chrominance signal separator 18. An output terminal of adaptive luminance signal separator 14 is coupled to an input terminal of an adaptive folding circuit, generally indicated as 22 and to be described in greater detail further below. An output terminal of motion signal separator 16 is coupled to a control input terminal of adaptive luminance signal separator 14 and to a motion signal input terminal of chrominance signal combining circuit 24. An output terminal of chrominance signal separator 18 is coupled to a chrominance signal input terminal of chrominance/motion signal combining circuit 24. An output terminal of chrominance/motion signal combining circuit 24 is coupled to a data input terminal of an encoder 26. An output of encoder 26 is coupled to a digital to analog converter (D/A) 28. An output terminal of D/A converter 28 is coupled to the input terminal of a chrominance record circuit 30. An output of chrominance record circuit 30 is coupled to a record head 32. Record head 32 records a signal supplied to it on magnetic recording tape in a video cassette.

The output terminal of adaptive luminance signal separator 14 is coupled to an input terminal of a horizontal high pass filter (HPF) 34, an input terminal of a horizontal low pass filter (LPF) 36, a first data input terminal of a soft switch 38 and to a data input terminal of a programmable attenuator 40. An output of horizontal HPF 34 is coupled to an input terminal of a level detector 42. An output terminal of level detector 42 is coupled to a control input terminal of soft switch 38. An output terminal of horizontal LPF 36 is coupled to a second data input terminal of soft switch 38. The output of programmable attenuator 40 is coupled to a first terminal of a weighted adder 44 whose input signal applied at its first data terminal is weighted by ½. An output terminal of soft switch 38 is coupled to a data input terminal of a modulator 46. A clock signal input terminal of modulator 46 is coupled to a source $S_S$ of a folding carrier signal having a frequency of $f_f$. An output terminal of modulator 46 is coupled to a data input terminal of a programmable attenuator 48. The output of attenuator 48 is coupled to a second data input terminal of weighted adder 44, whose input signal applied at its second data terminal is weighted by ½. An output terminal of weighted adder 44 is coupled to an input terminal of a low pass filter (LPF) 50. An output terminal of LPF 50 is coupled to the input of a D/A converter 52. The output of D/A converter 52 is coupled to a luminance record circuit 54, similar to such circuits found in present VCR's.

An output terminal of motion signal separator 16 is coupled to a control input terminal of adaptive luminance signal separator 14 and a motion signal input terminal of a chrominance/motion signal combining circuit 24. An output terminal of chrominance/motion signal combining circuit 24 is coupled to an input terminal of an encoder 26. An output of chrominance record circuit 30 is coupled to record head 32.

A user selectable code generator 56 has its output terminal coupled to an encoding input terminal of encoder 26, and to respective control inputs of attenuator 48 and attenuator 40.

The operation of the circuitry shown in the block diagram of FIG. 1 will next be described. Further details on certain portions of the circuitry are described in the afore-mentioned U.S. Pat. No. 5,113,262 pending U.S. patent application Ser. No. 07/569,029, filed Aug. 17, 1990 by Strolle et al., entitled AN IMPROVED VIDEO SIGNAL RECORDING SYSTEM (Samsung Docket No. 1020).

The composite video signal input is converted by D/A 12 to a sampled data multibit digital composite video signal V. The sampling frequency is selected in a manner more fully described below. For an NTSC signal, the sampling frequency may be selected to be about 10 MHz, for example. Signal V is supplied to the adaptive luminance separator 14, which extracts the luminance component L, to the motion signal separator 16, which extracts a motion representative signal M, and to a chrominance signal separator 18, which extracts the chrominance signal component.

The extracted luminance signal L is further processed by the adaptive folding circuit 22. This circuit folds attenuated high frequency components of the luminance signal L back into lower frequency components, and filters the resulting signal so that all the information in the full-bandwidth luminance signal L is contained in a folded luminance signal $L_f$ which has a bandwidth of about 2.5 MHz. The adaptive folding circuit 22 will be described in more detail below. The folded luminance signal $L_f$ is converted to an analog signal $L_r$ in D/A 52. Thus, this signal is in a form in which it can be recorded on a video cassette by luminance recording circuitry 54.

The extracted motion signal M and the extracted chrominance signal C are combined into a single composite signal C+M in the chrominance/motion signal combining circuit 24. The C+M signal is converted into an analog signal by D/A 28. Thus, this signal is in a form in which it can be recorded on a video cassette by chrominance recording circuitry 30.

In the operation of the adaptive folding circuitry 22 shown in the block diagram of FIG. 1, the combination of horizontal HPF 34, level detector 42, horizontal LPF 36 and soft switch 38 forms an adaptive depeaker which reduces the amplitude of the luminance high frequencies to a level such that if reproduced on a VCR which had no provision for removing them, the artifacts do not cause the reproduced picture to be unacceptable. The operation of the adaptive depeaker is described in detail in U.S. Pat. No. 5,113,262.

Briefly, horizontal HPF 34 extracts the high frequency luminance signal. The level of the luminance high frequencies is detected in the level detector 42. Level detector 42 operates in a known manner as an envelope detector to produce a signal which has the value of the maximum amplitude of the high frequency luminance signal. Soft switch 38 can be of a type such as that described in U.S. Pat. No. 5,113,262.

Horizontal LPF 36 produces a signal in which the luminance high frequencies are attenuated relative to the luminance low frequencies. When the level of luminance high frequencies, as detected by level detector 42, is zero or nearly zero, then the high frequencies do not need to be attenuated, and the output signal from soft switch 38 is completely from input terminal 505 carrying the unfiltered luminance signal L. As the level of luminance high frequencies increases, the luminance high frequencies need to be attenuated. In this situation, the proportion of unfiltered luminance signal L decreases in the output signal LD from the soft switch 38 and the proportion of low pass filtered luminance signal increases. When the level of luminance high frequencies is a maximum or nearly a maximum, then the high frequencies need to be attenuated to the maximum extent and the output signal LD from soft switch 38 is completely from the horizontal LPF 36.

The depeaked luminance signal LD is then modulated about a folding carrier having a frequency $f_f$ in modulator 46. The folding frequency is selected so as to maximize the separation between the folding carrier and the baseband luminance signal in the temporal, vertical and horizontal directions.

The output of modulator 46 has a lower sideband containing a spectral image of the 4.2 MHz bandwidth depeaked signal but inverted in frequency. That is, the depeaked luminance signal is folded about the folding frequency $f_f$. Low depeaked baseband frequencies are folded into the vicinity of 5 MHz and high depeaked baseband luminance frequencies of 4.2 MHz, for example, are folded into the vicinity of 800 kHz.

The output of modulator 46, i.e. the folded depeaked luminance signal, is then passed through a programmable attenuator 48 and thereafter to an input of a weighted adder 44. The baseband luminance signal is passed through a programmable attenuator 40 and applied to the other input of weighted adder 44 so as to be combined with the folded depeaked luminance signal to form a composite signal which is low pass filtered by low pass filter 50.

Programmable attenuators 48 and 40 have their control inputs coupled to a user selectable code generator 56. The output of code generator 56 depends upon an input provided by a user and determines the attenuation provided by attenuators 48 and 40. The attenuators are capable of positive and negative attenuation, that is they can boost as well as attenuate. Programmable attenuators 48 and 40 are controlled in a complementary manner, that is, when attenuator 48 exhibits high attenuation, then attenuator 40 exhibits low attenuation and vice versa. The actual values of attenuation are predetermined such that at one extreme, the composite signal from adder 44 provides a I-VHS signal for recording that is highly backward compatible for playback on a standard VHS machine and at the other extreme, provides a I-VHS signal that takes advantage of the bandwidth capability of I-VHS so as to provide a high quality picture for playback on an I-VHS machine but is less compatible for playback on a standard VHS machine.

In a simple version in accordance with the present invention, these may be the only two options available. Thus, when attenuator 48 exhibits a relatively high attenuation and attenuator 40 exhibits a relatively low attenuation, the recorded signal will be of a lesser quality but more backward compatible than with the converse condition where the attenuation levels of attenuators 48 and 40 are interchanged.

In another version in accordance with the present invention, a plurality of options can be made available, representing a range of compromise values in between the extremes, as may be desired in various applications.

The output of user selectable code generator 56 is also applied to encoder 26 which correspondingly encodes, in a manner known per se, the chrominance/motion signal C+M from signal combining circuit 24 before its application to D/A converter 28. Thus, information on the settings selected in the programming of attenuators 48 and 40 is recorded along with the C+M signal for use during playback.

The folded depeaked luminance signal is then combined with the baseband luminance signal in weighted adder 44. This composite signal is then low pass filtered by LPF 50, which has a passband sufficiently narrow so as to eliminate all of the signal which would not pass through the narrow-band channel.

Figure 2:
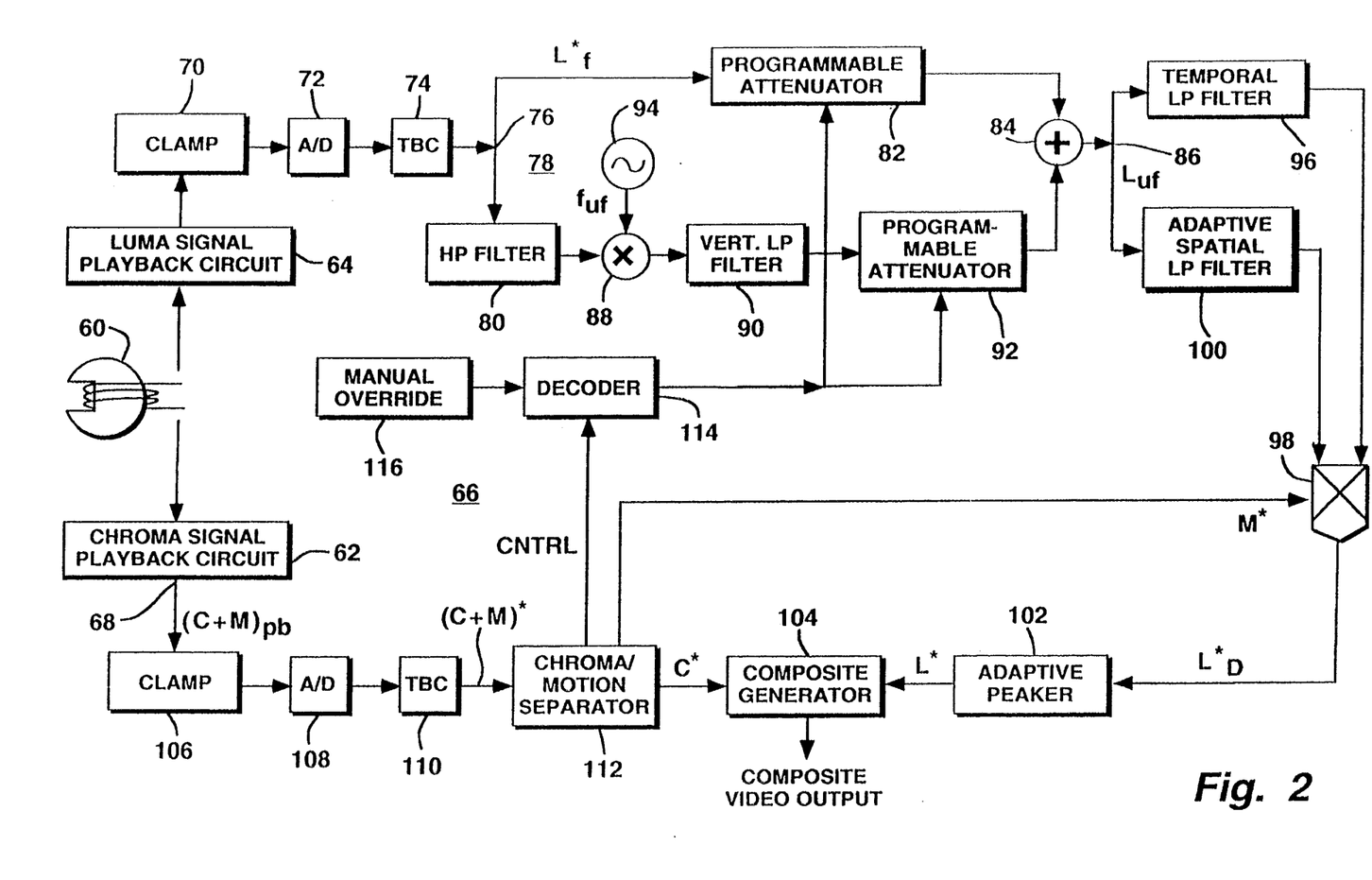
FIG. 2 shows a block schematic diagram of playback apparatus in accordance with an embodiment of the invention.

FIG. 2 shows a schematic block diagram of a portion of a playback section of a video signal recorder in accordance with the principles of the present invention. In reference to FIG. 2, a playback head 60 is incorporated in a standard tape transport (not shown) of a VCR. Playback head 60 is coupled to respective input terminals of a luminance signal playback circuit 60 and a chrominance signal playback circuit 62. An output terminal of luminance signal playback circuit 60 is coupled to a first input terminal 64 of a decoder, generally indicated as 66, and an output terminal of chrominance signal playback circuit 62 is coupled to a second input terminal 68 of decoder 66.

In operation, playback head 60 supplies its signal to both the luminance playback circuit 60 and the chrominance playback circuit 62, in a known manner. The previously recorded folded luminance signal occupies a band of frequencies at around 1.4–5.9 MHz, and the previously recorded chrominance plus motion signal occupies a 1 MHz band of frequencies at around 629 kHz. The luminance playback circuitry processes the folded luminance signal in the usual manner to produce the playback folded luminance signal $L_{pb}$. The chrominance playback circuitry processes the chrominance plus motion signal to produce the playback chrominance plus motion signal $C+M_{pb}$. These signals are then processed by decoder 66 which extracts the motion signal from the chrominance signal and uses it to aid in unfolding the folded high frequency luminance component and reconstructing the full bandwidth luminance signal. The reconstructed full bandwidth luminance signal and the chrominance signals are then combined to form a composite video signal at a terminal 15.

Referring now to the circuitry of decoder 66 as shown in the block schematic diagram of FIG. 2, input terminal 64 is coupled to an input terminal of a clamping circuit 70. An output terminal of clamping circuit 70 is coupled to an input terminal of an analog to digital converter (A/D) 72. An output of A/D 72 is coupled to an input terminal to a time base corrector (TBC) 74. An output terminal of TBC 74 is coupled to a data input terminal 76 of an adaptive unfolding circuit, generally indicated as 78. Input terminal 76 is coupled go an input terminal of a high pass filter (HPF) 80 and to an input of a programmable attenuator 82. An output of programmable attenuator 82 is coupled to a first input terminal of an adder 84. An output terminal of adder 984 is coupled to an output terminal 86. An output terminal of HPF 80 is coupled to an input terminal of a modulator 88. An output terminal of modulator 88 is coupled to an input terminal of a vertical low pass filter (LPF) 90. An output terminal of vertical LPF 90 is coupled to an input terminal of a second programmable attenuator E. An output terminal of programmable attenuator E is coupled to a second input terminal of adder 984. A second input terminal of modulator 88 is coupled to a source 94 of an unfolding carrier signal $f_{uf}$.

Terminal 86 is coupled to respective input terminals of a temporal low pass filter LPF 96 and an adaptive spatial LPF 100. An output terminal of temporal LPF 96 is coupled to a first data input terminal of a soft switch 98. An output terminal of adaptive spatial LPF 100 is coupled to a second data input terminal of soft switch 98. An output terminal of soft switch 98 is coupled to an input terminal of an adaptive peaker circuit 102. An output terminal of adaptive peaker 102 is coupled to the luminance signal input terminal of a composite video signal generator 104.

An output terminal of chrominance signal playback circuit 62 is coupled to an input terminal of a clamping circuit 106. An output terminal of clamping circuit 106 is coupled to an input terminal of an analog to digital converter (A/D) 108. An output terminal of A/D 108 is coupled to an input terminal of a time base corrector (TBC) 110. An output terminal of TBC 110 is coupled to an input terminal of a chrominance/motion signal separator 112. A first output terminal of the chrominance/motion signal separator 112 is coupled to a second input terminal of the composite video signal generator 104. A second output terminal of chrominance/motion signal separator 112 is coupled to a control terminal of soft switch 98. A third output terminal of chrominance/motion signal separator 112 is coupled to an input terminal of a decoder 114. An output of decoder 114 is coupled to respective control inputs of programmable attenuator 92 and programmable attenuator 82. An output of a manual override control unit H is coupled to a control input of decoder 114.

In operation of the system shown in FIG. 2, the chrominance plus motion signal previously recorded on the cassette tape is a bidirectional signal, so the zero voltage of this signal is clamped to a digital signal of 128 out of 255 in clamping circuit 106. The A/D 108 produces a sampled multibit digital signal representing the chrominance plus motion signal and the TBC 110 operates to correct any timing inaccuracies in this signal, and produces the recovered chrominance plus motion signal $C+M^*$.

Phase inaccuracies due to the recording process may exist between the luminance and chrominance signals which are not compensated in the separate TBC's 74 and 110. Apparatus for restoring the proper phase relationship is described in U.S. Pat. No. 5,083,197 issued Jan. 21, 1992, to Jong-Wan Ko and Chandrakant B. Patel; entitled APPARATUS FOR RESTORING THE CORRECT PHASE RELATION OF THE CHROMA AND LUMINANCE SIGNALS PASSED THROUGH SEPARATE PATHS; and incorporated herein by reference.

Chrominance/motion separator 112 processes the recovered chrominance plus motion signal $C+M^*$ to produce a recovered motion signal $M^*$, which is supplied to the control input terminal of the adaptive unfolding circuit 78, and the chrominance signal $C^*$, which is supplied to the chrominance signal input terminal of the composite video signal generator 104.

The adaptive unfolding circuit 78 unfolds the luminance high frequencies which were previously folded into the luminance low frequencies, and restores the full bandwidth luminance signal $L^*$. This full bandwidth signal $L^*$ is supplied to the luminance signal input terminal of composite video signal generator 104. Composite video signal generator 104 operates in a known manner to combine the luminance signal $L^*$ and chrominance signal $C^*$ to form a standard composite video signal. This signal may be used by equipment which utilizes such a signal, for example, a television receiver.

Signal $L_{uf}^*$ at terminal 76 is the limited bandwidth folded luminance signal. The horizontal HPF 80 filters out the frequencies below the folded luminance signal containing the chrominance information.

The demodulated signal from modulator 88 is filtered by vertical low pass filter 90 and coupled by way of programmable attenuator 92 to an input of an adder 984. The received folded luminance signal from TBC 74 is coupled by way of a programmable attenuator 82 to the other input of adder 984. The resulting unfolded signal $L_{uf}$ depends on the attenuator settings. Under the conditions of a normally recorded I-VHS signal, signal $L_{uf}$ consists of a full bandwidth unfolded luminance signal centered around temporal, vertical and horizontal DC, and an image of the full bandwidth luminance signal centered on the unfolding carrier which is at one-half the maximum temporal frequency, one-half the maximum vertical frequency and at a horizontal frequency of about 5 MHz.

Information relating to the attenuator settings optionally selected for use during the recording process is derived from the signal encoded along with the $C+M$ signal and obtained during playback in the form of a control signal CNTRL from decoder G, coupled to chroma/motion separator 112. This control signal CNTRL is coupled to control inputs of attenuators 92 and 82 for setting their respective attenuation levels. These attenuation levels are arranged to compensate for the attenuator settings used during the recording process. Programmable attenuators 92 and 82 have positive and negative attenuation capability, that is, they can provide a boost as well an amplitude reduction. Attenuators 92 and 82 respond in complementary fashion to the CNTRL signal, so that the overall level remains reasonably flat over the spectral range.

A manual override control unit 116 allows a user to select an operational mode whereby decoder 114 sets the attenuation of attenuators 92 and 82 to default values that allow operation to be essentially in accordance with the original system as described in U.S. Pat. No. 5,113,262. In this operating mode, the system is unresponsive to the information relating to the attenuator settings optionally selected for use during the recording process and derived from the signal encoded along with the C+M signal and obtained during playback in the form of a recovered control signal CNTRL from decoder 114.

Adaptive spatial LPF 100 operates adaptively to separate spatially the unfolded luminance signal $L_{uf}$. Soft switch 98 controls the proportion of the temporally separated and adaptively spatially separated unfolded full bandwidth luminance signals to be included in the unfolded luminance signal in response to the recovered motion control signal M*. When the level of motion is zero or nearly zero, the output of the soft switch 98 is completely from the temporal LPF 96. As the magnitude of motion gradually increases, the proportion of the input from the temporal LPF 96 decreases and the proportion of the input from the adaptive spatial LPF 100 increases. In the presence of relatively high levels of motion, the output from the soft switch 98 is from the adaptive spatial LPF 100.

The output from soft switch 98 is a depeaked luminance signal. Adaptive peaker 102 is used to boost the attenuated luminance high frequencies to restore them to the original level before the attenuation. The output of adaptive peaker 102 is then applied to one of the inputs of composite generator 104 which provides the composite video output referred to above.

Further details on certain portions of the circuitry are described in U.S. Pat. No. 5,113,262.

The present invention has been described in terms of illustrative embodiments by way of example. Various modifications and changes may be carried out without departing from the invention.

Furthermore, where the chroma subcarrier is encoded with phase relationships that are different from the VHS system forming the context of the described embodiments, such in the PAL and Beta formats, the present invention is adaptable with appropriate adjustment of the subcarrier phases utilized. Furthermore, while the system has been described in terms suitable for in relation to the NTSC system, it is clearly applicable to other systems with different standards. While digital signal processing has been shown, clearly various functions can be equivalently carried out in analog technology.

These and other modifications will be apparent to those skilled in the art and are intended to be within the scope and spirit of the invention which is defined by the claims following.

We claim:

1. In a backward compatible video signal recording and playback system for recording a full bandwidth video signal on a limited bandwidth medium utilizing a luminance signal having high frequencies being folded into low frequencies of said luminance signal to provide a folded-luminance signal for recording, which said folded-luminance signal is unfolded on playback to provide a reproduced full bandwidth video signal, a method for selecting a desired level of high frequency performance for a given degree of reverse compatibility, comprising the steps of:

a. attenuating in an adjustable ratio said high frequencies being folded into said low frequencies of said folded-luminance signal respective to said low frequencies, said adjustable ratio being described by a level signal and being determined at least in part by the setting of a control adapted for setting by a human being;

b. recording said level signal and said folded-luminance signal on said limited bandwidth medium;

c. sensing said level signal and said folded-luminance signal during playback from said limited bandwidth medium;

d. unfolding said folded-luminance signal to generate an unfolded luminance signal; and e. utilizing said level signal as a control signal for adjusting the level of the high frequencies of said unfolded luminance signal, so as to correspond substantially to the level of the high frequencies in said luminance signal respective to the level of the low frequencies of said luminance signal before said luminance signal being folded.

2. A method in accordance with claim 1, wherein step b is performed by encoding said level signal into a data stream being recorded on magnetic tape, said magnetic tape being said limited bandwidth medium.

3. A backward compatible video signal recording system for recording a full bandwidth video signal on a limited bandwidth medium, said system comprising:

means responsive to a composite video signal for producing a luminance signal having attenuated high frequencies folded into low frequencies, and for producing a plural-component signal including a chrominance component and a motion component, said motion signal being indicative of frame-to-frame changes in said composite video signal;

means for recording said luminance signal on said limited bandwidth medium;

means for recording said plural-component signal on said limited bandwidth medium;

user operable means for determining the value of an adjustable ratio, by which ratio said high frequencies are reduced respective to said low frequencies, said means for determining the value of said adjustable ratio including means for providing a level signal indicative of said ratio;

means applying said level signal to one of said means for recording said luminance signal and said means for recording said plural-component signal, for recording said level signal on said limited bandwidth medium.

4. A video signal recording system in accordance with claim 3, wherein said applying means applies said level signal to said means for recording said plural-component signal.

5. A video playback system for reproducing a full bandwidth video signal prerecorded on a limited bandwidth medium along with a control signal representative of a relative amplitude setting of a folded spectral portion of luminance high frequencies, said system comprising:

a luminance signal playback circuit for retrieving a prerecorded luminance signal from said medium;

a chrominance signal playback circuit for retrieving a prerecorded combined chrominance and motion signal from said medium;

separator circuit means coupled to said chrominance signal playback circuit for extracting said motion signal and said chrominance signal from said combined chrominance and motion signal;

decoder means coupled to said separator circuit means for retrieving said control signal from said combined chrominance and motion signal;

unfolding circuit means for extracting said folded spectral portion of said luminance high frequencies from said prerecorded luminance signal and adaptively regenerating said full bandwidth luminance signal in response to said motion signal;

programmable attenuator means coupled to said unfolding circuit means and being responsive to said control signal for compensating for said relative amplitude setting of said folded spectral portion of said luminance high frequencies; and means for combining said full bandwidth luminance signal with said extracted chrominance signal for reproducing said full bandwidth video signal prerecorded on said limited bandwidth medium.

6. For use in a backward compatible video signal recording and playback system in which a full bandwidth video signal is recorded on a limited bandwidth medium, utilizing a luminance signal having high frequencies being folded into low frequencies and unfolded on playback, a method performed during recording comprising the steps of:

generating a level signal so its value can be selected by a human being;

generating a folded-frequency-spectrum signal by folding said high frequencies of said luminance signal and attenuating, in an amount indicated by said level signal, said high frequencies respective to said low frequencies; and recording both said level signal and said folded-frequency-spectrum signal on said limited bandwidth medium.

7. For use in a backward compatible video signal recording and playback system in which a full bandwidth video signal is recorded on a limited bandwidth medium, utilizing a luminance signal having high frequencies being folded into low frequencies and unfolded on playback, a recording on said limited bandwidth medium made in accordance with a recording method comprising the steps of:

generating a level signal so its value can be selected by a human being;

generating a folded-frequency-spectrum signal by folding said high frequencies into said low frequencies of said luminance signal and attenuating, in an amount indicated by said level signal, said high frequencies respective to said low frequencies; and recording both said level signal and said folded-frequency-spectrum signal on said limited bandwidth medium.

8. For use in a backward compatible video signal recording and playback system in which a full bandwidth video signal is recorded on a limited bandwidth medium, utilizing a luminance signal having high frequencies being folded into low frequencies and unfolded on playback, a method performed during playback of a recording as set forth in claim 7 comprising the steps of:

sensing said level signal and said folded-frequency-spectrum signal during playback from said limited bandwidth medium;

unfolding said folded-frequency-spectrum signal to generate an unfolded luminance signal; and utilizing said level signal as a control signal for adjusting the level of the high frequencies of said unfolded luminance signal respective to the level of the low frequencies of said unfolded luminance signal, so as to reproduce said full bandwidth video signal.

9. In a backward compatible video signal recording and playback system for recording a full bandwidth video signal on a limited bandwidth medium utilizing a luminance signal having high frequencies being folded into low frequencies during recording and unfolded on playback, playback apparatus for reproducing said full bandwidth video signal from a recording as set forth in claim 7 comprising:

means for sensing said level signal and said folded-frequency-spectrum signal during playback of said recording;

means for unfolding said folded-frequency spectrum signal to generate an unfolded luminance signal; and means for responding to said level signal for adjusting the level of the high frequencies of said unfolded luminance signal respective to the level of the low frequencies of said unfolded luminance signal, so as to reproduce said full bandwidth video signal.

10. In a backward compatible video signal recording system for recording a full bandwidth video signal on a limited bandwidth medium utilizing a luminance signal having high frequencies being folded into low frequencies during recording and unfolded on playback, a recording apparatus comprising:

means for generating a level signal so its value can be selected by a human being;

means for attenuating, in an indicated amount as indicated by said level signal, the high frequencies of said full bandwidth video signal relative to the low frequencies of said full bandwidth video signal, and for folding the high frequencies of said full bandwidth video signal into the low frequencies of said full bandwidth video signal during recording; and means for recording said level signal on said limited bandwidth medium during recording.

11. A video signal recording system, comprising:

luminance signal separating means for separating an extracted luminance signal from a composite video signal, said extracted luminance signal comprising a low frequency portion and a high frequency portion;

means for generating a folded luminance signal comprising said low frequency portion and a folded said high frequency portion folded into a frequency range of said low frequency portion, said folded luminance signal being generated by frequency folding said high frequency portion of said extracted luminance signal into said low frequency portion of said extracted luminance signal and by regulating amplitudes, in response to a level signal, of said low frequency portion of said folded luminance signal relative to amplitudes of said folded high frequency portion;

means for generating said level signal in response to user selection of a degree of backwards compatibility; and means for recording said folded luminance signal on a recording medium.

12. A video signal recording system as claimed in claim 11, wherein said folded luminance signal generating means frequency folds said high frequency portion prior to said regulating of said amplitudes of said low frequency portion of said folded luminance signal relative to amplitudes of said folded high frequency portion.

13. A video signal recording system as claimed in claim 11, further comprising:
means for recording said level signal on said recording medium.

14. A video signal recording system as claimed in claim 11, further comprising:
chrominance signal separating means for separating an extracted chrominance signal from said composite video signal;
means for generating an encoded chrominance signal by encoding said level signal in said extracted chrominance signal; and
means for recording said encoded chrominance signal on said recording medium.

15. A video signal recording system as claimed in claim 11, further comprising:
chrominance signal separating means for separating an extracted chrominance signal from said composite video signal;
motion signal separating means for separating an extracted motion signal from said composite video signal, said extracted motion signal being indicative of image motion in said composite video signal;
means for generating a combined chroma/motion signal by combining said extracted motion signal and said extracted chrominance signal;
means for generating an encoded chroma/motion signal by encoding said level signal in said combined chroma/motion signal; and
means for recording said encoded chroma/motion signal on said recording medium.

16. A video signal recording system as claimed in claim 11, wherein said folded luminance signal generating means comprises:
folding means for generating a folded preliminary luminance signal by frequency folding said high frequency portion of said extracted luminance signal onto said low frequency portion of said extracted luminance signal;
regulating and combining means for regulating the amplitudes of said extracted luminance signals relative to the amplitudes of said folded preliminary luminance signal in response to said level signal, and for combining said extracted luminance signals and said folded preliminary luminance signal having the regulated amplitudes to generate said folded luminance signal.

17. A video signal recording system as claimed in claim 16, wherein said regulating and combining means comprises:
first programmable attenuating means for regulating the amplitudes of said extracted luminance signal in response to said level signal;
second programmable attenuating means for regulating the amplitudes of said folded preliminary luminance signal, complementary to said first programmable attenuating means regulation of said extracted luminance signal, in response to said level signal; and
adding means for generating said folded luminance signal by combining the regulated said extracted luminance signal and the regulated said folded preliminary luminance signal.

18. A video signal recording system as claimed in claim 17, wherein said folded luminance signal generating means further comprises:
depeaking means for providing a depeaked extracted luminance signal by limiting amplitude of said high frequency portion of said extracted luminance signal prior to provision to said folding means.

19. A video signal recording system as claimed in claim 18, wherein said depeaking means comprises:
horizontal low pass filter means for generating a low pass filtered luminance signal; by low pass filtering said extracted luminance signal;
horizontal high pass filter means for generating a high pass filtered luminance signal by high pass filtering said extracted luminance signal;
level detecting means for detecting levels of said high pass filtered luminance signals; and
soft switch means for generating the depeaked said extracted luminance signal provided to said folding means by combining said low pass filtered luminance signal and said extracted luminance signal in proportions determined by in response to the detected levels of said high pass filtered luminance signals.

20. A video signal reproducing system, comprising:
means for reproducing a folded luminance signal from a recording medium, said folded luminance signal comprising a low frequency portion and a folded high frequency portion frequency folded into a frequency range of said low frequency portion prior to the recording of said folded luminance signal;
means for generating an unfolded luminance signal comprising said low frequency portion and an unfolded high frequency portion by unfolding said folded high frequency portion from said frequency range of said low frequency portion and by regulating amplitudes of said low frequency portion of said unfolded luminance signal relative to said unfolded high frequency portion in response to a level signal; and
means for reproducing said level signal from said recording medium.

21. A video signal reproducing system as claimed in claim 20, further comprising:
means for removing remnants of said folded high frequency portion contained in said unfolded luminance signal to generate an unfolded-filtered luminance signal.

22. A video signal reproducing system as claimed in claim 20, wherein said level signal reproducing means comprises:
means for reproducing chrominance/motion signal from said recording medium;
means for separating a chrominance signal, an encoded signal, and a motion signal from said chrominance/motion signal, said motion signal being indicative of image motion; and
means for decoding said encoded signal to generate said level signal.

23. A video signal reproducing system as claimed in claim 21, wherein said removing means comprises:
temporal low pass filtering means for generating a temporally filtered luminance signal by temporally low pass filtering said unfolded luminance signal;
spatial low pass filtering means for generating a spatially filtered luminance signal by spatially low pass filtering said unfolded luminance signal; and
soft switch means for proportionally combining said temporally filtered luminance signal and said spatially filtered luminance signal in response to said motion signal.

24. A video signal reproducing system as claimed in claim 22, further comprising:
temporal low pass filtering means for generating a temporally filtered luminance signal by temporally low pass filtering said unfolded luminance signal;
spatial low pass filtering means for generating a spatially filtered luminance signal by spatially low pass filtering said unfolded luminance signal; and
soft switch means for proportionally combining said temporally filtered luminance signal and said spatially filtered luminance signal in response to said motion signal.

25. A video signal reproducing system as claimed in claim 20, wherein said unfolded luminance signal generating means comprises:
unfolding means for unfolding said folded high frequency portion of said folded luminance signal to generate an unfolded preliminary luminance signal; and
regulating and combining means for regulating the amplitudes of said unfolded preliminary luminance signal relative to the amplitudes of said unfolded luminance signal in response to said level signal, and for combining said unfolded preliminary luminance signal and said unfolded luminance signal having the regulated amplitudes to generate said unfolded luminance signal.

26. A video signal reproducing system as claimed in claim 25, wherein said regulating and combining means comprises:
first programmable attenuating means for regulating the amplitudes of said folded luminance signal in response to said level signal;
second programmable attenuating means for regulating the amplitudes of said unfolded preliminary luminance signal, complementary to said first programmable attenuating means regulation of said folded luminance signal, in response to said level signal; and
adding means for generating said unfolded luminance signal by combining the regulated said folded luminance signal and the regulated said folded preliminary luminance signal.

27. A video signal recording system, comprising:
luminance signal separating means for separating an extracted luminance signal from a composite video signal, said extracted luminance signal comprising a low frequency portion and a high frequency portion;
means for generating a folded luminance signal comprising said low frequency portion and a folded said high frequency portion folded into a frequency range of said low frequency portion, said folded luminance signal being generated by frequency folding said high frequency portion of said extracted luminance signal into said low frequency portion of said extracted luminance signal and by regulating amplitudes, in response to a level signal, of said low frequency portion of said folded luminance signal relative to amplitudes of said folded high frequency portion;
means for recording said level signal on a recording medium; and
means for recording said folded luminance signal on said recording medium.

28. A video signal recording system as claimed in claim 27, wherein said folded luminance signal generating means frequency folds said high frequency portion prior to said regulating amplitudes of said low frequency portion of said folded luminance signal relative to amplitudes of said folded high frequency portion.

29. A method for recording video signal, said method comprising:
separating an extracted luminance signal from a composite video signal, said extracted luminance signal comprising a low frequency portion and a high frequency portion;
generating a folded luminance signal comprising said low frequency portion and a folded said high frequency portion folded into a frequency range of said low frequency portion, said folded luminance signal being generated by frequency folding said high frequency portion of said extracted luminance signal into said low frequency portion of said extracted luminance signal and by regulating amplitudes, in response to a level signal, of said low frequency portion of said folded luminance signal relative to amplitudes of said folded high frequency portion;
recording said level signal on a recording medium; and
recording said folded luminance signal on said recording medium.

30. A method as claimed in claim 29, further comprising:
unfolding said folded high frequency portion of said folded luminance signal to generate an unfolded preliminary luminance signal;
regulating the amplitudes of said folded luminance signal in response to said level signal;
regulating the amplitudes of said unfolded preliminary luminance signal, complimentary to said regulation the amplitudes of said folded luminance signal, in response to said level signal; and
generating said unfolded luminance signal by combining the regulated said folded luminance signal and the regulated said folded preliminary luminance signal.

31. A method for reproducing a video signal, comprising:
reproducing a folded luminance signal from a recording medium, said folded luminance signal comprising a low frequency portion and a folded high frequency portion frequency folded into a frequency range of said low frequency portion prior to the recording of said folded luminance signal;
reproducing a level signal from said recording medium; and
generating an unfolded luminance signal comprising said low frequency portion and an unfolded high frequency portion by unfolding said folded high frequency portion from said frequency range of said low frequency portion and by regulating amplitudes of said low frequency portion of said unfolded luminance signal relative to said unfolded high frequency portion in response to said level signal.

32. A method as claimed in claim 31, further comprising:
unfolding said folded high frequency portion of said folded luminance signal to generate an unfolded preliminary luminance signal; and regulating the amplitudes of said folded luminance signal in response to said level signal;

regulating the amplitudes of said unfolded preliminary luminance signal, complimentary to said regulation of said folded luminance signal, in response to said level signal; and generating said unfolded luminance signal by combining the regulated said folded luminance signal and the regulated said folded preliminary luminance signal.

* * * * *